Oct. 24, 1944.    C. M. WEEKS    2,361,251
VALVE
Filed Nov. 7, 1942
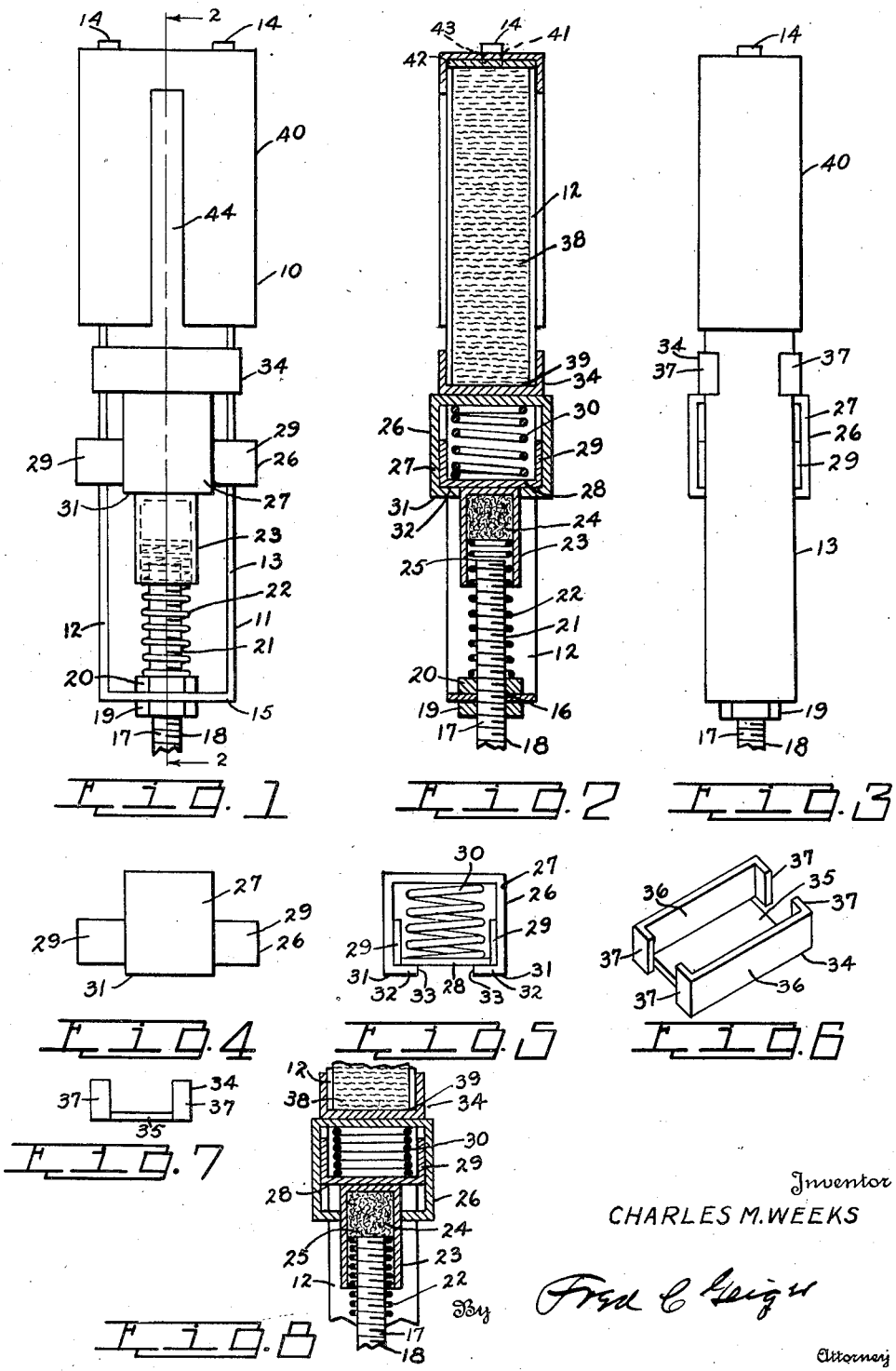
Inventor
CHARLES M. WEEKS
By Fred C Geiger
Attorney Patented Oct. 24, 1944

2,361,251

UNITED STATES PATENT OFFICE 2,361,251

VALVE

Charles M. Weeks, Washington, D. C.

Application November 7, 1942, Serial No. 464,871

9 Claims. (Cl. 137—139)

The present invention relates to improvements in valves.

An object of the present invention is the provision of a valve responsive to changes in liquid level.

Another object of the present invention is the provision of means in the valve responsive to liquid and atmosphere.

A still further object of the present invention is the provision of compensating means in the valve to provide for any structural changes that may occur in the expansible element or other parts.

A still further object of the present invention is the provision of a valve adapted for various uses.

Other objects of the present invention will be more apparent from the description and claims when taken in conjunction with the accompanying drawing in which:

Figure 1 is a front elevational view of the valve.

Figure 2 is a sectional view taken on line 2—2 of Figure 1.

Figure 3 is a side elevational view of the valve.

Figure 4 is an end view of the compensating member.

Figure 5 is a front view of the compensating member and illustrating the movable plate and spring.

Figure 6 is a perspective view of the cup seat per se.

Figure 7 is an end view of the cup seat.

Figure 8 is a fragmentary sectional view illustrating the position of the valve seat, the housing, plate, and spring of the compensating member when the conduit is closed by the valve seat.

Referring to the drawing, the numeral 10 represents the valve and it comprises a frame 11 having arms 12 and 13, the ends of the arms having a reduced portion 14 for a purpose to be later described. The bottom 15 of the frame 11 is provided with an aperture 16 that receives a threaded portion 17 of a conduit 18, the conduit being rigidly secured to the bottom 15 in any suitable manner, such as by nuts 19 and 20. The portion 21 of the conduit 18 extends upwardly into the frame 11, and encompassing the portion 21 is a spring 22, a portion of which is housed in a valve seat 23, the spring 22 having one end resting on the nut 20 and normally holding the valve seat away from the conduit opening 25. In the upper portion of the valve seat there is provided suitable material 24 adapted for engagement with the end of the conduit at 25 for sealing off liquid flow. Within the frame member arms 12 and 13 there is mounted a slidable member 26 that comprises a housing 27, a plate member 28 having guide arms 29 and a spring 30 interposed between the top face of the plate 28 and the inner wall of the housing 27. The bottom portion 31 of the housing 27 has interned flanges 32, the edge walls 33 of which are in spaced relation and equal to the diameter of the valve seat. The plate member 28 and the spring 30 are held in assembled relation in the housing 27 by the flanges 32. The flanges 32 being in spaced relation, the valve seat fits into the opening, the edge walls 33 engaging the peripheral wall of the valve seat 23, the top of the valve seat impinging the bottom face of the plate 28, the plate being normally held in impingement with the flanges 32 by the spring 30.

Mounted within the frame member arms 12 and 13 and superposed upon the housing 27 is a plate 34 having a bottom portion 35 of a width slightly less than the width of the arms 12 and 13, and it is provided with flanges 36 that are bent upwardly and at their ends 37 inwardly, forming a cup and slidable guide means for the plate member 34. Interposed between the arms 12 and 13 is an expansive element 38 of any material that will absorb water and, as illustrated, the element is of wood, the grain of the wood being transverse to the length of the element, one end 39 of element 38 being seated in the cup portion of member 34. The upper portion of the frame member 11 is provided with a cover 40 having apertures 41 in the top thereof. Within the cover is mounted a plate 42 having apertures 43 that are in register with the apertures 41. The apertures 43 and 41 receive the reduced portions 14 and, as illustrated in the drawing, are bent to secure the cover 40 to the frame arms 12 and 13. The cover is provided on each side with a longitudinal opening 44.

In the operation of the device the valve assembly is positioned in a receptacle (not shown), at a predetermined point, water enters the receptacle through the conduit 18 and it continues to flow until it reaches the expansible member 38. As the member 38 absorbs the water, the member expands and during its expansion impinges the plate 34 against the housing 27, forcing the housing downwardly, the plate member 28 impinging the valve seat 23 forcing the valve seat against the mouth of the conduit thereby closing the same, and as the expansion of the expansible member is greater than this distance, it continues to expand and compress the spring 30 of the compensating member so that the valve seat is held in a closed position through the entire cycle. The valve seat 23 is held in alignment by the walls 33 of the housing 27, the spring 30 serving as a means to keep the valve seat seated against the open end of the conduit 18.

Various changes may be made in the form of the invention herein shown and described, without departing from the spirit of the invention or the scope of the following claims.

What is claimed is:

1. A valve comprising a frame, a conduit connected to said frame, expansible and contractible means in said frame, a movable seat member in said frame supporting said expansible and contractible means, a valve seat member in said frame and adapted to seat on end of said conduit, a resilient means interposed between said frame and said valve seat, a movable member having guide means in said frame, the movable member having end walls capable of relative movement to and from one another, one engaging the movable seat member and the other engaging the valve seat member and having a resilient means interposed between the walls.

2. The combination with a valve including a frame having arms, a cover, a conduit, a valve seat and a movable member, said valve seat adapted to contact the end of said conduit, said movable member adapted to move toward said valve seat, an expansible member in said cover, a resilient means interposed between the valve seat and the frame, the grain of the expansible member being transverse of the length of the member for actuating the valve seat and movable member responsive to changes in moisture content of the expansible member, the side walls of said cover having openings therein.

3. In combination with a valve comprising a frame having arms, a cover, a conduit and conduit closing means in said frame, resilient means in contact with said frame and said conduit closing means, expansible and contractible means in said frame, a cushion means interposed between said expansible and contractible means and said conduit closing means, the arms of said frame having cover locking means.

4. A valve comprising a frame, a conduit secured to said frame, a valve seat adapted to contact the end of said conduit, resilient means interposed between said frame and said valve seat, compensating means in said frame and in contact with said valve seat, a cup member having guide means in said frame in engagement with said compensating means, an expansible and contractible means interposed in said frame and having one end seated in said cup, a plate impinging the opposite end of the expansible and contractible means, and a cover housing said plate and said expansible means, the side walls of said cover having openings therein.

5. A valve comprising a frame, liquid conducting means connected to said frame, a valve seat in said frame, a resilient compensating seat and liquid absorbing expansible means in said frame, said expansible means when expanded adapted for engagement with said compensating seat, said compensating seat means engageable with said valve seat in a direction of expansion opposite to the direction of expansion of said liquid absorbing expansible means, said valve seat adapted to close said liquid conducting means.

6. A valve comprising a frame having arms, a cover for said frame, liquid conducting means connected to said frame, a valve seat in said frame, resilient compensating means in said frame, seat and liquid responsive expansible means in said frame, said seat engaging said resilient compensating means, said compensating means adapted for engagement with said valve seat in a direction of expansion opposite to the direction of expansion of said liquid expansible means, said valve seat adapted to close said liquid conducting means, said frame having cover locking means.

7. A valve seat comprising a frame, liquid conducting means connected to said frame, a valve seat engageable with the liquid conducting means, resilient means interposed between said valve seat and said frame, compensating means in said frame provided with compression means, means in said compensating means engageable with said valve seat and held in engagement therewith by said compression means, seat means in said frame in engagement with said compensating means, expansible and contractible means in said frame having one end positioned in said seat, said expansible and contractible means when expanded closing said liquid conducting means.

8. In a valve comprising a frame, liquid conducting means secured to said frame, means adapted for closing said liquid conducting means, resilient means interposed between said frame and said closing means, expansible and contractible means in said frame, and resilient means intermediate said closing means and said expansible and contractible means.

9. In a valve comprising a frame, liquid conducting means secured to said frame, means adapted for closing said liquid conducting means, resilient means interposed between said frame and said closing means, expansible and contractible means in said frame, and resilient means intermediate said closing means and said expansible and contractible means, said resilient means intermediate said expansible and contractible means and said closing means being of greater tension than the resilient means interposed between said frame and said conduit closing means.

CHARLES M. WEEKS.